(12) United States Patent
Yu et al.

(10) Patent No.: US 10,717,384 B2
(45) Date of Patent: Jul. 21, 2020

(54) SYSTEM AND METHOD FOR PROJECTING TRAJECTORY PATH OF AN AUTONOMOUS VEHICLE ONTO A ROAD SURFACE

(71) Applicant: Pony AI Inc., Grand Cayman (KY)

(72) Inventors: Xiang Yu, Santa Clara, CA (US);
Zichao Qi, Mountain View, CA (US);
Hao Song, Sunnyvale, CA (US); Sinan Xiao, Fremont, CA (US); Bo Xiao, San Jose, CA (US); Jie Hou, San Francisco, CA (US); Tianyi Li, San Jose, CA (US); Tiancheng Lou, Milpitas, CA (US); Jun Peng, Fremont, CA (US); Yiming Liu, San Jose, CA (US)

(73) Assignee: Pony AI Inc., Grand Cayman (KY)

( * ) Notice: Subject to any disclaimer, the term of this patent is extended or adjusted under 35 U.S.C. 154(b) by 198 days.

(21) Appl. No.: 15/793,210

(22) Filed: Oct. 25, 2017

(65) Prior Publication Data
US 2019/0118705 A1    Apr. 25, 2019

(51) Int. Cl.
| | | |
|---|---|---|
| *B60Q 1/50* | (2006.01) | |
| *B60Q 1/34* | (2006.01) | |
| *G05D 1/00* | (2006.01) | |
| *G05D 1/02* | (2020.01) | |

(52) U.S. Cl.
CPC ............ *B60Q 1/503* (2013.01); *B60Q 1/346* (2013.01); *G05D 1/0088* (2013.01); *G05D 1/0212* (2013.01); *B60Q 2400/50* (2013.01); *G05D 2201/0213* (2013.01)

(58) Field of Classification Search
CPC .... B60Q 1/503; B60Q 1/346; B60Q 2400/50; G05D 1/0088; G05D 1/0212; G05D 2201/0213

USPC .......................................................... 701/25
See application file for complete search history.

(56) References Cited

U.S. PATENT DOCUMENTS

| | | |
|---|---|---|
| 5,615,116 A | 3/1997 | Gudat et al. |
| 6,385,515 B1 | 5/2002 | Dickson et al. |
| 7,447,593 B2 | 11/2008 | Estkowski et al. |
| 7,656,313 B2 | 2/2010 | Victor et al. |

(Continued)

FOREIGN PATENT DOCUMENTS

| | | | |
|---|---|---|---|
| JP | 2916625 B1 | * | 7/1999 |
| JP | 2014098948 A | * | 5/2014 |
| JP | 6007409 B2 | * | 10/2016 |

*Primary Examiner* — Tuan C To
(74) *Attorney, Agent, or Firm* — Sheppard Mullin Richter & Hampton LLP

(57) ABSTRACT

Systems and methods directed to projecting a current trajectory path of the autonomous vehicle on a surface of road is disclosed. In some embodiments, an autonomous vehicle with a light projector is disclosed, where the light projector is on a top surface of an autonomous vehicle. Additionally, in some embodiments, the autonomous vehicle may include an electronic control unit for controlling an operation of the light projector, where the electronic control unit detects whether the autonomous vehicle is turned on. In further embodiments, the electronic control unit receives data of an environmental condition surrounding the autonomous vehicle and receives an upcoming trajectory path of the autonomous vehicle. The electronic control unit may also project a light from the light projector onto a surface of a road indicating the upcoming trajectory path of the autonomous vehicle.

21 Claims, 7 Drawing Sheets

(56) References Cited

U.S. PATENT DOCUMENTS

| | | | |
|---|---|---|---|
| 8,849,494 B1 | 9/2014 | Herbach et al. | |
| 9,405,293 B2 | 8/2016 | Meuleau | |
| 9,457,807 B2* | 10/2016 | Lee | B60W 10/20 |
| 9,821,801 B2* | 11/2017 | Di Cairano | B60W 30/10 |
| 9,880,561 B2* | 1/2018 | Russell | G05D 1/0242 |
| 9,910,441 B2 | 3/2018 | Levinson et al. | |
| 9,933,784 B1 | 4/2018 | Herbach et al. | |
| 10,358,085 B2* | 7/2019 | Kim | B60Q 9/00 |
| 10,371,534 B2* | 8/2019 | Min | G01C 21/32 |
| 2009/0024357 A1 | 1/2009 | Aso et al. | |
| 2009/0125175 A1* | 5/2009 | Park | G05D 1/024 |
| | | | 701/28 |
| 2009/0319113 A1* | 12/2009 | Lee | B62D 15/025 |
| | | | 701/25 |
| 2010/0292871 A1* | 11/2010 | Schultz | G08G 5/0086 |
| | | | 701/3 |
| 2012/0166058 A1* | 6/2012 | Armbrust | B60Q 1/525 |
| | | | 701/96 |
| 2015/0203023 A1* | 7/2015 | Marti | B60Q 1/00 |
| | | | 340/425.5 |
| 2016/0247109 A1* | 8/2016 | Scicluna | G08G 1/202 |
| 2017/0240096 A1* | 8/2017 | Ross | B60Q 1/50 |
| 2018/0037154 A1* | 2/2018 | Dudar | B60Q 1/08 |
| 2018/0238696 A1* | 8/2018 | Takeda | G01C 21/3676 |
| 2019/0056231 A1* | 2/2019 | Bai | G01C 21/30 |
| 2019/0066509 A1* | 2/2019 | Dellock | G01S 17/936 |

\* cited by examiner

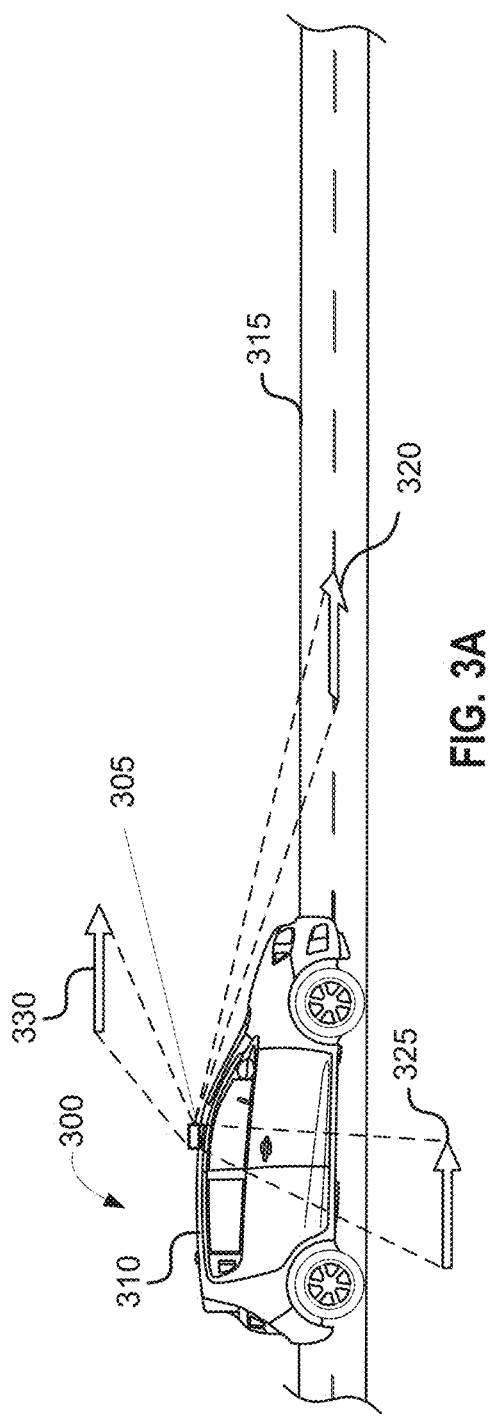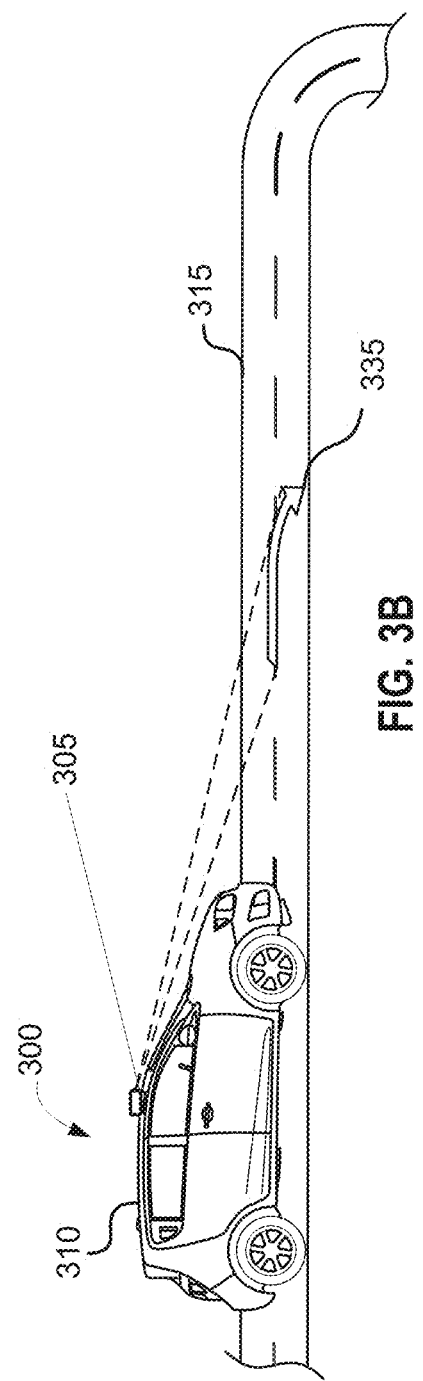

SYSTEM AND METHOD FOR PROJECTING TRAJECTORY PATH OF AN AUTONOMOUS VEHICLE ONTO A ROAD SURFACE

TECHNICAL FIELD

The present disclosure relates generally to autonomous vehicles, and in particular, some embodiments relate to projecting a current trajectory path of the autonomous vehicle on a surface of road.

BACKGROUND

Autonomous vehicles are self-driving vehicles that are capable of sensing an environment and navigating a road without continuous human input. As a result, autonomous vehicles may detect their immediate surroundings using radar, LIDAR, camera, GPS, odometry, computer vision, and the like.

Autonomous vehicles provide potential advantages of decreasing traffic collisions caused by human errors, such as those caused by delayed reaction time, tailgating, drinking and driving, speeding, distractions, and aggressive driving. While autonomous vehicles continue to advance with enhanced driving control systems and safety mechanisms that ensure reliability and safety of the autonomous vehicles, people have yet to fully trust autonomous technology.

SUMMARY

The present disclosure provides, in some embodiments, systems and methods for an autonomous vehicle to project its trajectory path onto a surface of a road. By projecting such trajectory information onto the surface, this may notify nearby pedestrians and other drivers of a potential path to be taken by the autonomous vehicle. This may then give assurance to the nearby pedestrians and the other drivers that the autonomous vehicle is expected to drive in a safe manner.

Also disclosed are embodiments directed to autonomous vehicle operation. In one embodiment, a system includes a light projector on a top surface of an autonomous vehicle. The system may also include an electronic control unit for controlling an operation of the light projector. By way of example, the electronic control unit may detect whether the autonomous vehicle is turned on. Additionally, the electronic control unit may receive data of an environmental condition surrounding the autonomous vehicle and receive a current trajectory path of the autonomous vehicle based on the received environmental condition data and map information. Furthermore, the electronic control unit may project light from the light projector onto a surface of a road indicating the current trajectory path of the autonomous vehicle Other embodiments include a method for projecting a trajectory path of an autonomous vehicle onto a surface of the road. In one embodiment, the method may include detecting whether an autonomous vehicle is turned on. The method may further include receiving data from an environmental condition surrounding the autonomous vehicle and receiving a current trajectory path of the autonomous vehicle. Furthermore, in other embodiments, the method may include projecting a light from a light projector located on a top surface of the autonomous vehicle onto a surface of a road to provide a visual notification of the current trajectory path of the autonomous vehicle.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 3A is an illustration of an autonomous vehicle projecting a current trajectory path on a surface of a road in accordance with various embodiments.

FIG. 3B is an illustration of an autonomous vehicle projecting a current trajectory path on a surface of a road in accordance with various embodiments.

The figures are not exhaustive and do not limit the present disclosure to the precise form disclosed.

DETAILED DESCRIPTION

Figure 1:
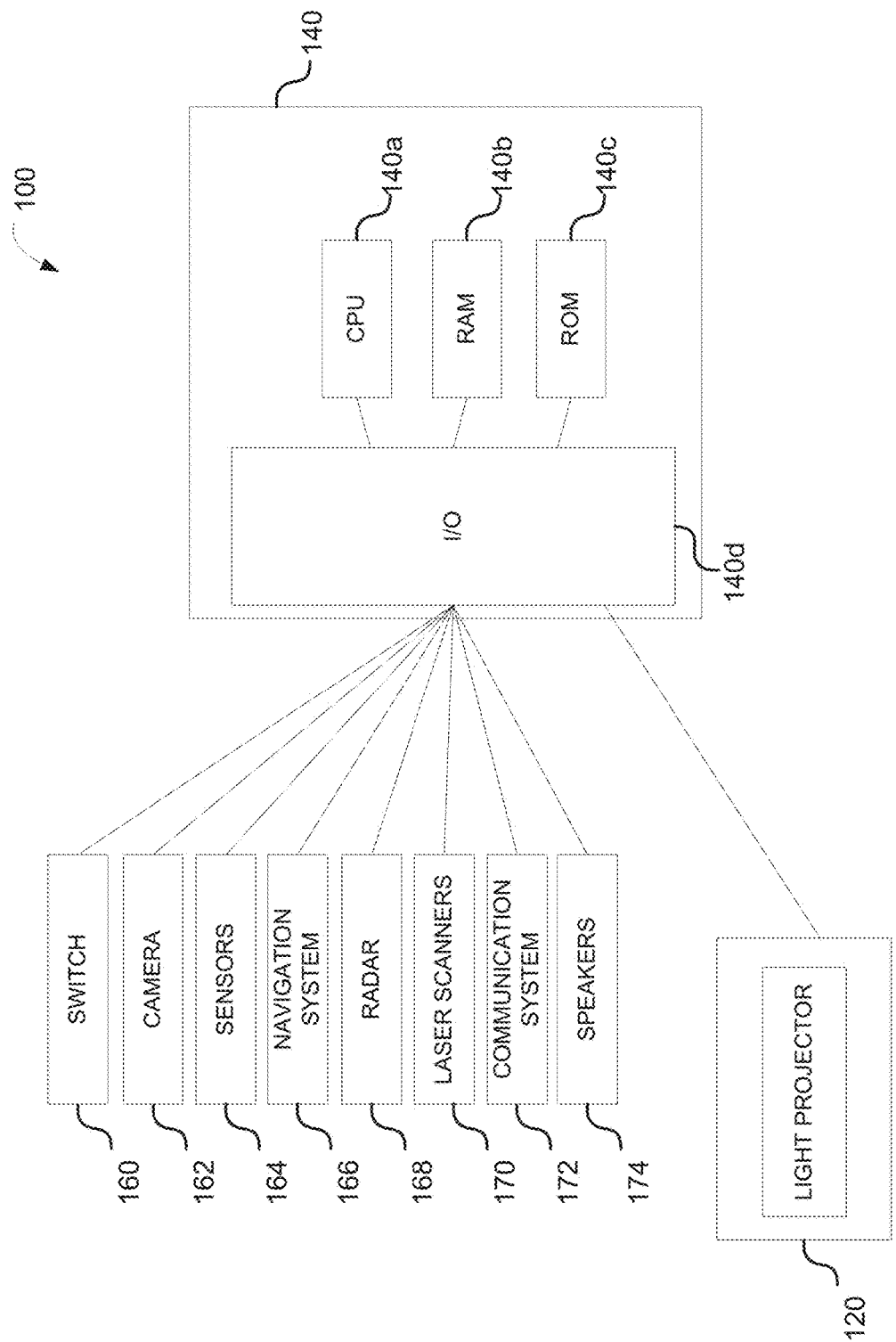
FIG. 1 is a schematic representation of light projector system of an autonomous vehicle in accordance with various embodiments of the disclosure.

FIG. 1 is a schematic representation of light projector system 100 of an autonomous vehicle in accordance with various embodiments of the disclosure. The light projector system 100 may include a light projector 120 controlled by the autonomous vehicle's electronic control unit 140. The light projector 120 may transmit light from a light source, such as a laser diode or light-emitting diodes ("LED"). The terms "optical" and "light" may be used herein to refer generally to any visible, infrared, or ultraviolet radiation. The light projector may transmit and project visual information in the form of images and patterns in a two-dimensional or three-dimensional rendering. The light projection may also project data and information, such as in the form of letters and numbers indicating real time information regarding the autonomous vehicle itself. More information about the content of the light projector's projected information is discussed in further detail below.

In some instances, the autonomous vehicle may include an electronic control unit ("ECU") 140. The ECU 140 may include a CPU 140a, a RAM 140b, a ROM 140c, and an I/O module 140d. The RAM 140b and ROM 140c may be used as, for example, memory storage devices to store data and instructions listing conditions and threshold requirements for turning on/off the light projector 120, as well as the visual content and information to be projected from the light projector 120. The ECU 140 may also be able to detect whether the autonomous vehicle 100 is turned on or off. If on, the ECU 140 may then turn on the light projector 120. In some instances, the ECU 140 may turn on the light projector 120 via the switch 160 under certain conditions, such as when the ECU 140 detects pedestrians or other vehicles anywhere from 0 to 1000 feet from the autonomous vehicle. By way of example, the ECU 140 may be able to detect for pedestrians utilizing any one of the vehicle cameras 162, sensors 164, navigation systems 166, radars 168, laser scanners 170, and communication systems 172 in communication with the ECU 140.

Additionally, the CPU 140a may perform various computations from the data gathered by the vehicle cameras 162, sensors 164, navigation systems 166, radars 168, laser scanners 170, and communications systems 172. Such computations may include determining the current trajectory path the autonomous vehicle based on the GPS route guidance input from the navigation system 166. Additionally, the trajectory path of the autonomous vehicle may be continuously modified and updated by continuously factoring in the immediate environmental and road conditions surrounding the autonomous vehicle.

By way of example, detecting for such environmental and road conditions may be determined by analyzing the one or more data gathered by the vehicle cameras 162, sensors 164, navigation systems 166, radars 168, laser scanners 170, and communications systems 172. The CPU 140a may then determine the safest trajectory route of the autonomous vehicle based on such factors and provided information. The I/O module 140d may be connected to various vehicle components, devices, and systems to detect certain environmental, road, and/or driving conditions to determine the upcoming trajectory path of the autonomous vehicle. For example, the I/O module 140d may be connected to cameras 162, sensors 164, navigation systems 166, communication systems 168, radar 170, and laser scanners 172. These various vehicle components may be used individually or in combination with one another to detect the select environmental, road, and/or driving conditions in real time.

By way of example, cameras 162 may be mounted in the interior and/or exterior sections of the autonomous vehicle. In some embodiments, the cameras 162 may be a still camera and/or video camera that may capture images and videos of the front, sides, and rear surrounding areas of the vehicle. The cameras 162 may be oriented to take images and videos of preceding vehicles and oncoming vehicles, as well as pedestrians, objects, and road conditions surrounding the general vicinity of the vehicle.

In some instances, images captured by the cameras 162 may be processed with object recognition software to detect certain objects of interest. By way of example, the cameras 162 may capture images and/or videos of the surrounding vehicle environment, which may include potential pedestrians, road signs, oncoming vehicles, preceding vehicles, and the like. The images and/or videos may then be processed by the CPU 140a, where they may then filtered with an object recognition software. To determine if any of the objects in the images and/or videos include objects of interest (e.g., pedestrians, road signs, oncoming vehicles, preceding vehicles, headlights, tail lights, and the like), the object recognition software may include a datastore with reference materials. By way of example, the reference materials may also include information regarding shapes, pixel intensities, lines, and other information that can be used to help further identify the objects of interest in the images and/or videos. By detecting for certain objects surrounding the autonomous vehicle 100, the ECU 140 may be able to factor the presence of the identified objects and make the determination whether the autonomous vehicle's trajectory needs to be changed or modified. For example, if the object recognition software identifies a pedestrian up ahead in line with the autonomous vehicle's determined trajectory path, this may indicate to the ECU 140 that the autonomous vehicle must proceed to a slow complete stop before approaching the pedestrian or re-routing a new trajectory path away from the identified pedestrian up ahead.

There may also be a plurality of sensors connected to the I/O module 140d, where the sensors 164 may be used to detect various environmental, road, or driving conditions. By way of example, such sensors 164 may detect distance between vehicles (e.g. radar sensors), speed of current autonomous vehicle travel (e.g. accelerometer and speedometer), object detection (e.g. radar sensors), motion detection (e.g., motion sensors), moisture detection (e.g., moisture detection sensors), steering handling detection (steering wheel sensors), and the like. The sensors alone or in combination with the camera 162, navigation system 166, radar 168, the laser scanners 170, and communication systems 172 may be used to collect data in real time, which may then be processed by the CPU 140a. Thus, the sensors 164 may also be utilized to help determine a safe upcoming trajectory path for the autonomous vehicle.

The navigation system 166 may also be connected to the I/O module 140d. The navigation system 166 may include a navigation processor, a navigation adjustment component, and a GPS component. In some embodiments, the navigation system 166 may determine the location of vehicle in real time and determine the current and upcoming road and traffic conditions using a GPS component (which may include or be a GPS receiver). In some embodiments, navigation system 166 may receive information from third party service providers, such as current traffic information, weather information, road construction information, and the like. While the navigation system 266 may provide quickest route or provide a route based on driver specifications (e.g., no toll road, no highways, no private roads, etc.), the autonomous vehicle may also utilize the camera 162, sensors 164, radar 168, laser scanners 170, and communication systems 172 to determine the safest upcoming trajectory of the autonomous vehicle in real time.

A radar 168 and laser scanner 170 may also be connected to the I/O module 140d. The radar 168 may utilize electromagnetic radiation to detect other vehicles or objects located near the autonomous vehicle. Additionally, the laser scanner 170 may emit a light beam such that when the light beam is reflected back after hitting a surface of an object in the environment, objects may then be detected. Based on vehicles or objects detected via the radar 168 and laser scanner 170, the ECU 140 may determine the safest upcoming trajectory of the autonomous vehicle in real time.

By way of further example, the communication system 172 may also be connected to the I/O module 140d. The communication system 172 may include telematic systems, such as on-board diagnostics (OBD) systems installed within autonomous vehicles, which may be configured to access vehicle computers and transmit vehicle data to the CPU 140a. In some instances, the communication system 168 may also include a Bluetooth system to enable communication between the vehicle and the driver's mobile phone. This may allow any data collected from a mobile device, such as location information, to be transmitted to the CPU 140a for data processing.

Additionally, the communication system 172 may also include vehicle-to-vehicle communication systems and/or vehicle-to-infrastructure communications systems, which can be used to share data and information amongst autonomous vehicles and/or data and information from roadside units. Shared data and information may include data collected by the autonomous vehicle, such as safety information, locations of curved or hilly sections of road, location of other autonomous vehicles, presence of upcoming of road signs, and the like. The ECU 140 may then use such gathered information to further determine the safest upcoming trajectory of the autonomous vehicle in real time.

Figure 2:
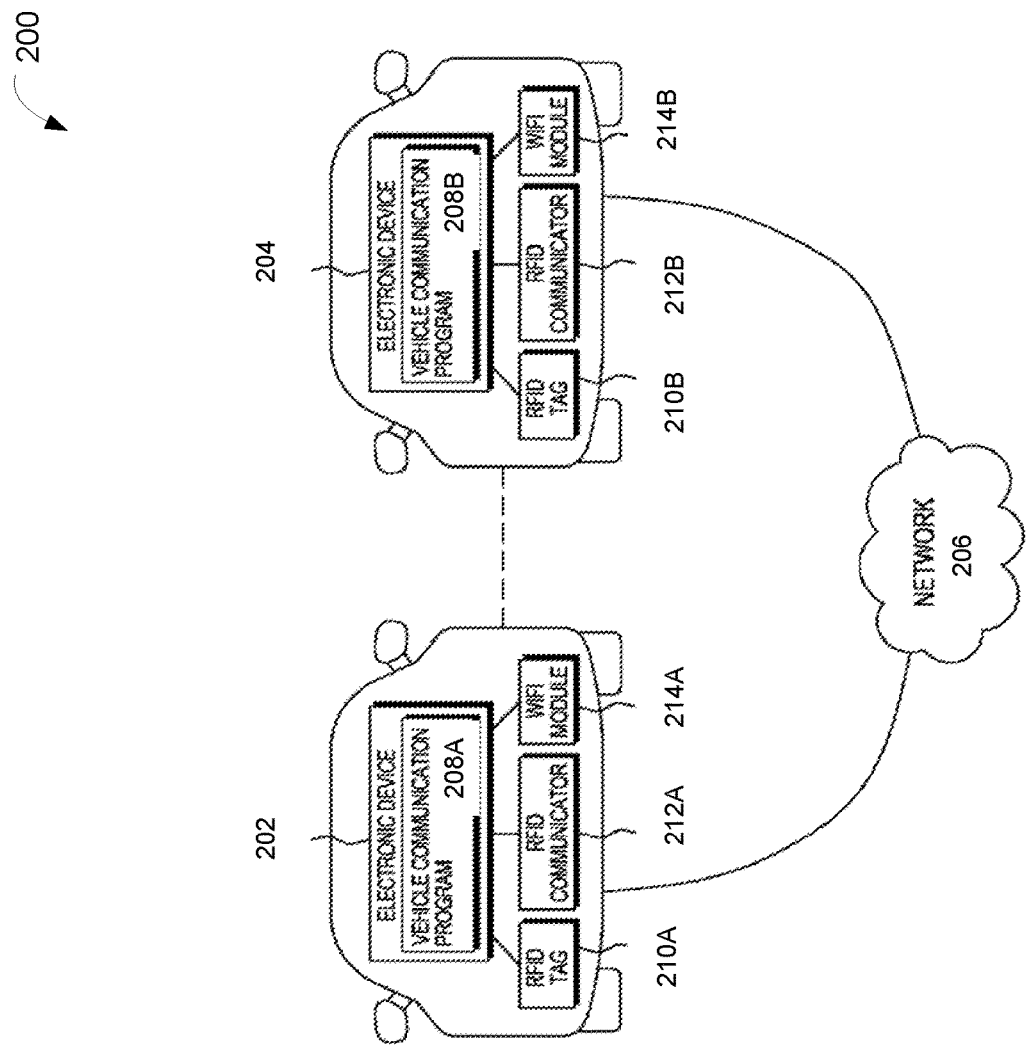
FIG. 2 is schematic representation of a vehicle communication system in accordance with various embodiments of the disclosure.

The communication system 172 is depicted in FIG. 2, which is a schematic representation of a vehicle communication system 200. The distributed data processing environment may include an electronic device 202 and electronic device 204 interconnected over network 206. By way of example, the electronic devices 202 and 204 may be an ECU, a transmission control unit (TCU), an integrated vehicle computer, a laptop computer, a tablet computer, a smartphone, or any programmable electronic device capable of receiving at least inputs and communicating with other electronic devices, network 206, RFID tag 210A and 210B, RFID communicator 212A and 212B, and WI-FI module 214A and 214B. The electronic device 202 may be located in a first vehicle and electronic device 204 may be located in a second vehicle.

A vehicle communication program 208A and 208B may each reside in electronic devices 202 and 204. The vehicle communication program 208 may have the ability to send and receive messages concerning safety, environment, road, and driving conditions. Additionally, the vehicle communication program 208A can determine whether electronic devices 204 with vehicle communication 208B is in the vicinity and then send the information.

RFID tag 210A and 210B may be radio-frequency identification tags which may respectively communicate with vehicle communication programs 208A and 208B to provide vehicle information. In one embodiment, the vehicle information can include vehicle identification number, where the communication program 208A may have the ability to determine information about the vehicle, such as the make and model of the vehicle. The RFID communicators 212A and 212B may communicate with communication programs 208A and 208B to send messages, receive messages, and identify vehicle in the vicinity based on the RFID tags 210A and 210B.

In another embodiment, the Wi-Fi module 214A and 214B can respectively communication with vehicle communication program 208A and 208B. For example, the Wi-Fi module 214A and 214B allow vehicle communication programs 208A and 208B to send and receive messages between electronic devices 202 and 204. The Wi-Fi module 214A can be associated with a vehicle and Wi-Fi module 214B can be associated with another vehicle, where each Wi-Fi module 214 utilizes a unique IP address.

In general, network 206 can be any combination of connections and protocols that can support communications between electronic device 202 and 204. Network 206 can include, for example, a local area network (LAN), a wide area network (WAN), such as the internet, a cellular network, or the combination of the preceding, and can further include wired, wireless, and/or fiber optic connections.

Thus, by way of example, data gathered from the above mentioned cameras 162, sensors 164, navigations system 166, radar 168, and laser scanners 170 may then be shared amongst the vehicles utilizing the communication system 172. In other words, data provided by the communication system 172 from other vehicles may then be factored and assessed to further help determine the safest trajectory path of the autonomous vehicle.

Furthermore, referring back to FIG. 1, speakers 174 may also be connected to the I/O module 140d. The speakers may be configured so that the audio may be heard by pedestrians or nearby drivers within the immediate vicinity of the autonomous vehicle. By way of example, the ECU 140 may provide an audible alert or notification via the speakers 174 when the autonomous vehicle detects a likelihood that its upcoming trajectory path will result in potentially harmful or dangerous conditions for nearby pedestrians or drivers. The CPU 140a may be able to make such a calculated determination using the camera 162, navigation system 166, radar 168, the laser scanners 170, and communication systems 172 as described in detail above. In some instances, the speakers 174 may transmit an audible notification in the instance that the CPU 140a determines that a collision or other dangerous scenario is expected to occur within 1000 feet of the autonomous vehicle. Thus, the audible notification from the speakers 174 may provide as a warning mechanism to nearby pedestrians to stay clear and away from the autonomous vehicle.

Furthermore in some embodiments, the communication system 172 may be in communication with other vehicles nearby with their own corresponding compatible communication system configured to transmit and receive communication from the communication system 172. By way of example, when the autonomous vehicle detects likelihood of collision with 1000 ft, the communication system 172 of the autonomous vehicle may alert other vehicles nearby of the potential dangerous scenario expected to occur. This may then cause other vehicle's to stay clear and away from the autonomous vehicle and prevent any further harm or collisions.

Additionally in some instances, the light projector 120 may be turned on when the camera 162, sensors 164, radar 169, and/or laser scanners 170 detect certain objects, such as the presence of nearby pedestrians or other drivers. Thus when the object recognition software or other in-vehicle device identifies the presence of pedestrians or other vehicles, the ECU 140 may command the light projector 120 to be switched on. By way of example, when the camera 162 identifies presence of pedestrians within 1000 ft. from the front end or sides of the autonomous vehicle, the ECU 140 may turn on the light projector 120 via the switch 160. Furthermore, in some instances, when the object recognition software confirms the absence of pedestrian presence, the ECU 140 may command the light projector 120 to be turned off and thus save power and energy. In other instances, the light projector 120 may be turned on when the ECU 140 detects presence of other vehicles sharing the road with the autonomous vehicle. Again, when the ECU 140 determines that no vehicles are nearby, such as within 1000 feet from the autonomous vehicle by way of example, the light project 120 may be turned off via the switch 160.

Upon determining the immediate and upcoming trajectory route, the ECU 140 may then control the light projector 120 and project the determined upcoming trajectory path on a surface of the road in front of the autonomous vehicle determined from the information provided by the cameras 162, sensors 164, navigation systems 166, communication systems 168, radar 170, and laser scanners 172.

FIG. 3A is an illustration of an autonomous vehicle 300 projecting an upcoming trajectory path 320, 325, 330 on a surface of a road 315 in accordance with various embodiments. As illustrated, a light projector 305 may be placed on a top surface 310 of an autonomous vehicle 300, such as the top roof above the windshield of an autonomous vehicle 300. However, it should be noted that the light projector 305 may be located in other areas on the autonomous vehicle 300 with an unobstructed illuminating path to the surface of a road 315, such as areas near the front bumper, front hood, or dashboard area.

In some embodiments, the light projector 305 may include a light source and concentrate the light rays onto a surface of the road 315 near the autonomous vehicle 300. In other instances, the light projector 305 may include one or more lasers and emit a laser beam(s) onto a surface of the road 315 near the autonomous vehicle 300. In some instances, the light projector 305 may utilize both a laser beam and a light beam to project the necessary visual information on a surface of the road. For example, the laser beam may be utilized to project straight lines or three-dimensional patterns and images. Furthermore, a light beam may be used in conjunction with the laser beam to help project patterns, images, and information onto the surface of the road 315 near the autonomous vehicle 300. By way of further example, the laser beams may be emitted to project straight lines and arrows while the lights beams may be simultaneously emitted to project a visual structure, such as a fence. Thus, both the laser beams and light beams may be simultaneously emitted to project the necessary visual information onto the surface of the road 315.

By way of example, once the autonomous vehicle 300 computes and obtains its trajectory path, as described in detail with reference to FIGS. 1-2, the upcoming trajectory path may be illuminated onto a surface of the road immediately in front of the autonomous vehicle 300. It should be noted that the trajectory path to be projected on the road 315 may be the immediate trajectory path of the autonomous vehicle and may be anywhere from 1 to 1000 feet of the autonomous vehicle's upcoming trajectory path.

In some embodiments, the upcoming trajectory path 320 may be illuminated anywhere from 1 to 100 feet in front of the autonomous vehicle 300. In further embodiments, the upcoming trajectory path 325, 330 may even be illuminated onto the surface of the road and/or ground on the sides of the autonomous vehicle 300. The upcoming trajectory path may be illuminated anywhere from 1 to 100 feet from the front or sides of the autonomous vehicle 300

As illustrated in FIG. 3A, the light projector 305 may emit information of the upcoming trajectory path 320, 325, 330 in front or sides of the autonomous vehicle. In some instance, the information may come in the form and shape of arrows to indicate the upcoming trajectory path of the of the autonomous vehicle. As indicated in FIG. 3A, if the autonomous vehicle is currently travelling in a straight road and is expected to continue in a straight path, as further indicated by the straight arrow indicator 320, 325, 330 projected onto the road 315 by the light projector 305.

As further illustrated in FIG. 3B, the light projector 305 may project arrow indicators 335 that correspond to its immediately upcoming trajectory path. For example, FIG. 3B illustrates that the autonomous vehicle 300 is expected to approach a curve ahead. As a result, the light projector 305 may project a curved arrow indicating the autonomous vehicle's 300 upcoming curved trajectory path immediately ahead. Thus, the light projector 305 may illuminate arrows that accurately convey the autonomous vehicle's 300 upcoming trajectory path. In further examples, the projected arrows may include a straight arrow, right-elbow arrow, left-elbow arrow, arc arrow in a clockwise direction, arc arrow in a counter clockwise direction, cyclic arrow in clockwise direction, cyclic arrow in a counter clockwise direction, U-shaped arrow, and the like in order to best and accurately convey the autonomous vehicle's 300 upcoming trajectory path.

Figure 3C:
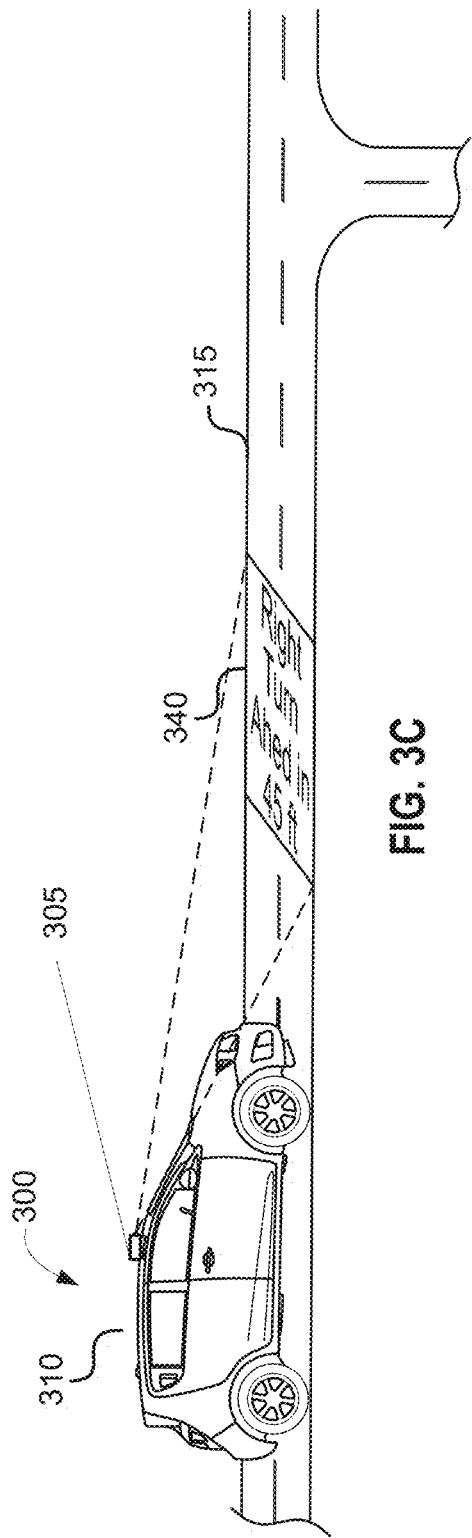
FIG. 3C is an illustration of an autonomous vehicle projecting a current trajectory path on a surface of a road in accordance with various embodiments.

While the projection of arrows may provide a quick visual indication of the autonomous vehicle's 300 immediate trajectory path, the indication of arrows alone may not provide the most obvious or precise indication of its upcoming trajectory path to others. As a result, the light projector 305 may project words and numbers onto a surface of the road to convey its immediately upcoming trajectory path. For example, as illustrated in FIG. 3C, the autonomous vehicle's upcoming trajectory path may be provided in words and numbers. Here, the figure provides an example where the light projector 305 projects information indicating that the autonomous vehicle 300 will proceed to make a "RIGHT TURN AHEAD IN 45 FT." As such, a pedestrian approaching or located near the autonomous vehicle may be able to quickly and accurately assess the autonomous vehicle's 300 precise upcoming trajectory upon viewing the information displayed on the surface of the road 315. However, it should be noted that in some instances, both the arrow and words and/or numbers may be projected onto a surface of the road from the light projector 315 or at the sides of the autonomous vehicle as depicted in FIG. 3A.

In some embodiments, the light projector 305 may project other information other than the autonomous vehicle's 300 upcoming trajectory path. For example, in some instances, the light projector 305 may project the autonomous vehicle's current speed. Such information may be provided by the sensors from the autonomous vehicle 300, such as the speedometer.

Figure 3D:
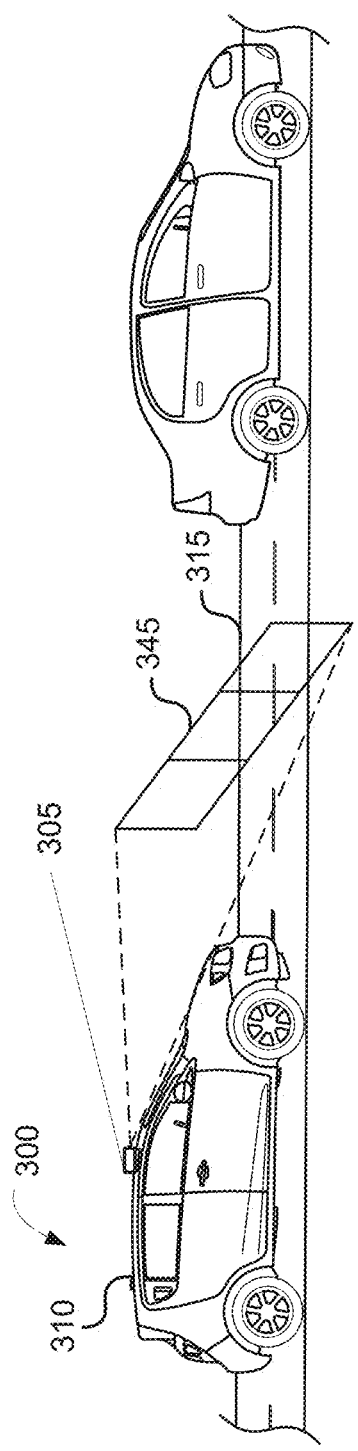
FIG. 3D is an illustration of an autonomous vehicle projecting a current stopping point on a surface of a road in accordance with various embodiments.

FIG. 3D is an illustration of an autonomous vehicle projecting an upcoming stopping point on a surface of a road in accordance with various embodiments. In some instances, the light projector 305 may project a 2-dimensional or 3-dimensional pattern or drawing onto a surface of the road near the autonomous vehicle. By way of example, the light projector 305 may project a rendering of a 2-dimensional or 3-dimensional fence 345 in front of the autonomous vehicle 300 to indicate the exact area on the road where the autonomous vehicle is expected to stop. It should be noted that the light projector 305 is not limited to a fence-like pattern or figure. Rather, the light projector 305 may project a STOP sign or any other visual message to relay the autonomous vehicle's stopping point. By way of example, such visual messages may include other road signs and symbols and pictures to convey visual information to nearby pedestrians and other drivers.

Figure 4:
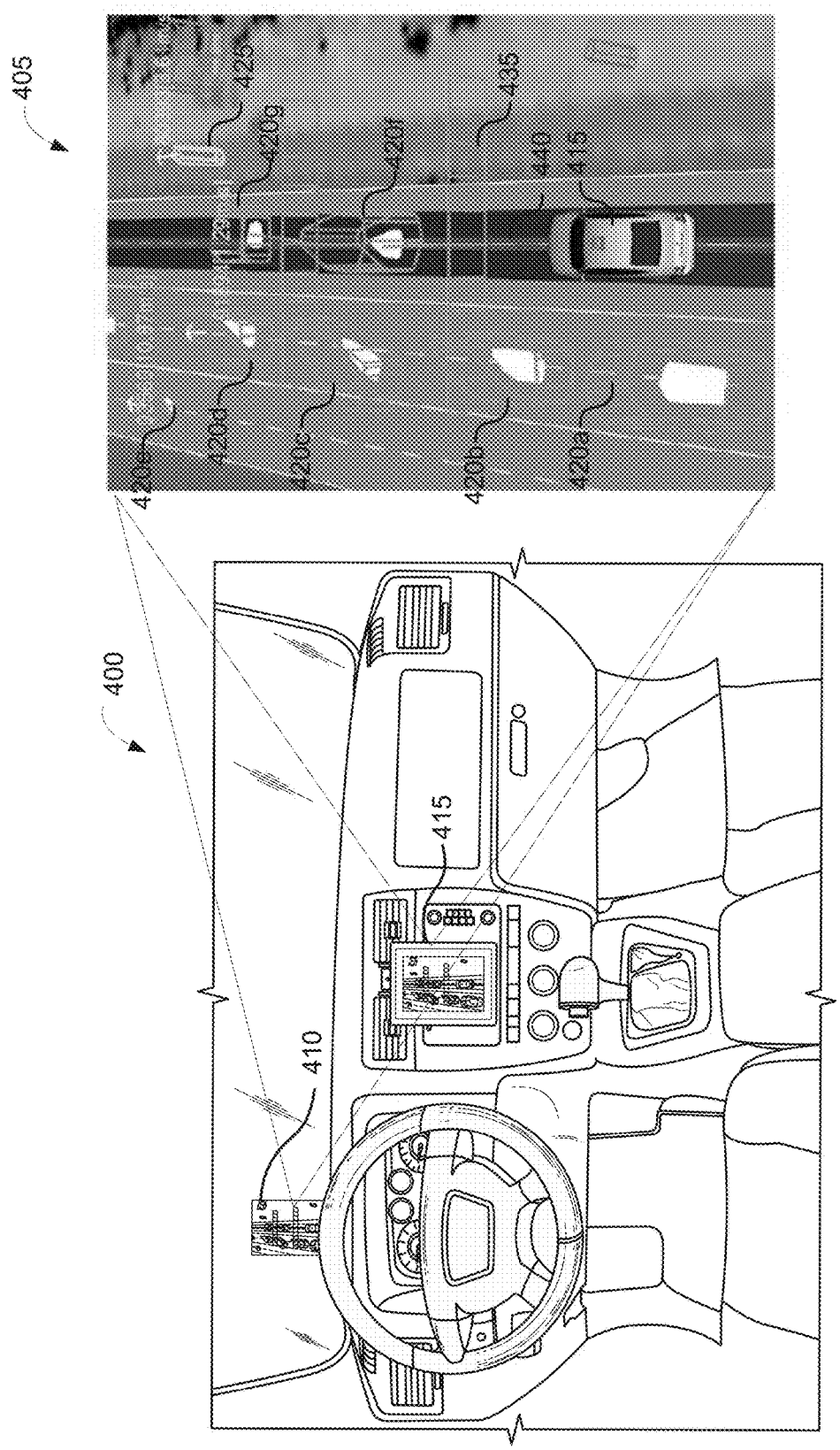
FIG. 4 is an illustration of an autonomous vehicle with its current trajectory path displayed on a screen in accordance with various embodiments.

FIG. 4 is an illustration of an autonomous vehicle 400 with its upcoming trajectory path displayed on a screen 410, 415 in accordance with various embodiments. Thus, the autonomous vehicle's upcoming trajectory path may also be conveyed to the driver and passenger of the autonomous vehicle by displaying such information on a display screen 410, 415 within the cabin of the autonomous vehicle 400. As illustrated, either one or both of the display screens 405, 410 may illustrate the road and environmental conditions surrounding the autonomous vehicle detected by its camera, navigation system, radar, the laser scanners, and communication systems. Such identified objects and road conditions may be identified and presented on the display screen 410, 415. By way of example, the display screen 410, 415 may present the following information as displayed in enlarged format at 405. Such information may include the autonomous vehicle's current location 415 and may even identify detected road and environmental conditions, such as other vehicles 420a, 420b, 420c, 420d, 420e, 420f, 420g and pedestrians 425.

Additionally, the display screen 410, 415 may also display the autonomous vehicle's trajectory path 440 as well as the information the light projector is projecting onto the surface of the road. For example, FIG. 4 depicts that the autonomous vehicle 400 is expected to travel in a straight trajectory path, as indicated by the straight trajectory path visual line 440. Furthermore, in this example, the autonomous vehicle is further expected to stop at a location immediately ahead, and thus the light projector will display a 2-dimensional or 3-dimensional fence 435 at the select area the autonomous vehicle is expected to stop. As a result, the display screen 410, 415 may indicate such a projected fence 435, thus notifying the driver and passenger of the upcoming trajectory path and stopping point of the autonomous vehicle 400.

Figure 5:
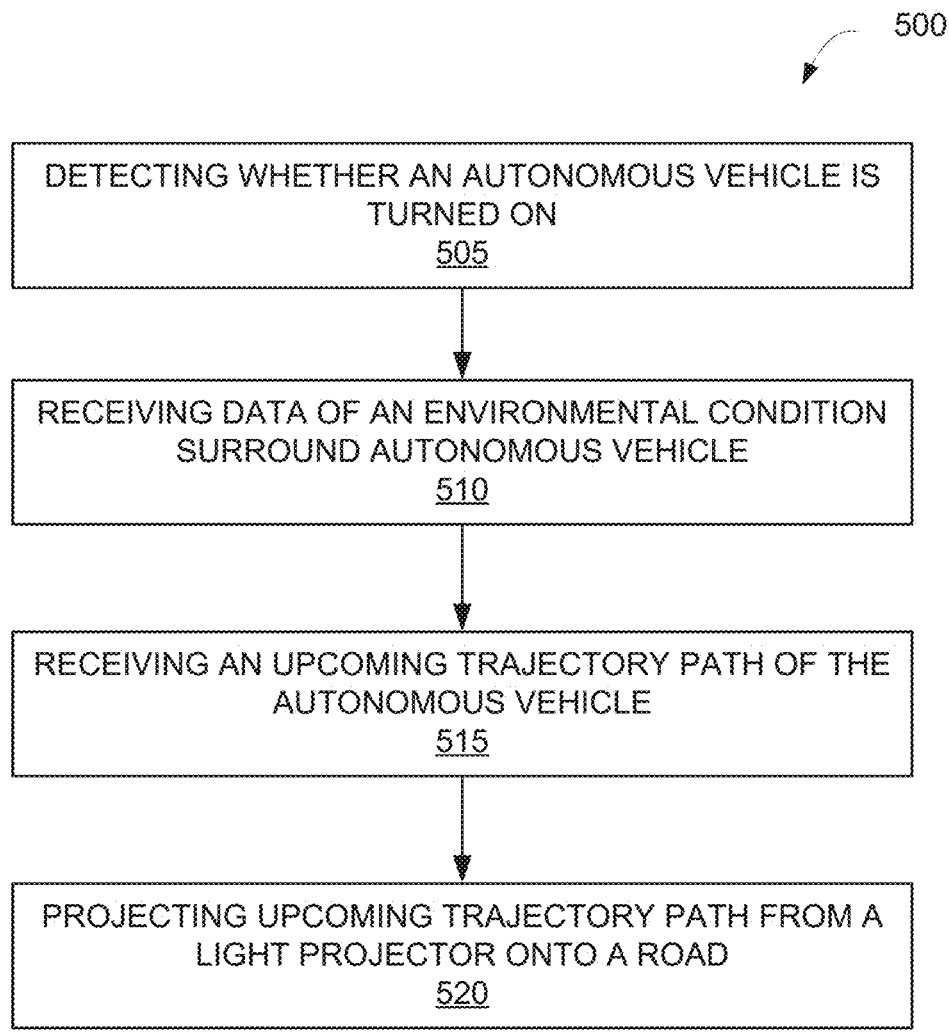
FIG. 5 is an exemplary process for projecting a current trajectory path of an autonomous vehicle in accordance with various embodiments.

FIG. 5 is an exemplary process 500 for projecting an upcoming trajectory path of an autonomous vehicle in accordance with various embodiments. By way of example, the process may proceed at step 505, where the autonomous vehicle with a light projector system may detect whether the autonomous vehicle is turned on.

Next, at step 510, the autonomous vehicle may receive data of the environmental conditions surrounding the autonomous vehicle. As described above in detail with reference to FIG. 1, the autonomous vehicle may detect and identify its surrounding environmental, road, and driving conditions based on the data collected from its in-vehicle devices, such as the cameras, sensors, navigation system, radar, laser scanner, and communication system. By way of example, one or more of the data received from one or more of the in-vehicle devices may be used to determine the safest trajectory route for the autonomous vehicle.

Next, at step 515, the autonomous vehicle may identify the current or upcoming trajectory path of the autonomous vehicle. The trajectory path may be determined from GPS route guidance provided by the navigation system. Additionally, the trajectory path may also be determined based on the environmental conditions detected by the autonomous vehicle. Thus, the trajectory path may be continuously updated in real time based on the real environmental conditions detected by the autonomous vehicle.

Next, at step 520, the light projector from the autonomous vehicle may project its current or upcoming trajectory path on a surface of the road. In some instances, the projection may be projected onto a surface of the road immediately in front of the autonomous vehicle. In other instances, the projection may be projected onto a surface of the road or sidewalk on the sides of the autonomous vehicle so that the projection may be more easily viewed by pedestrians or other drivers.

In some instances, the light projector may be turned on in certain environmental conditions, such as when the autonomous vehicle detects the presence of pedestrians or other vehicles near the autonomous vehicle. By way of example, the autonomous vehicle may project its upcoming trajectory path when it detects pedestrians or other vehicles within 1000 feet from the autonomous vehicle. In other instances, the light projector may turn on whenever the autonomous vehicle is turned on.

Figure 6:
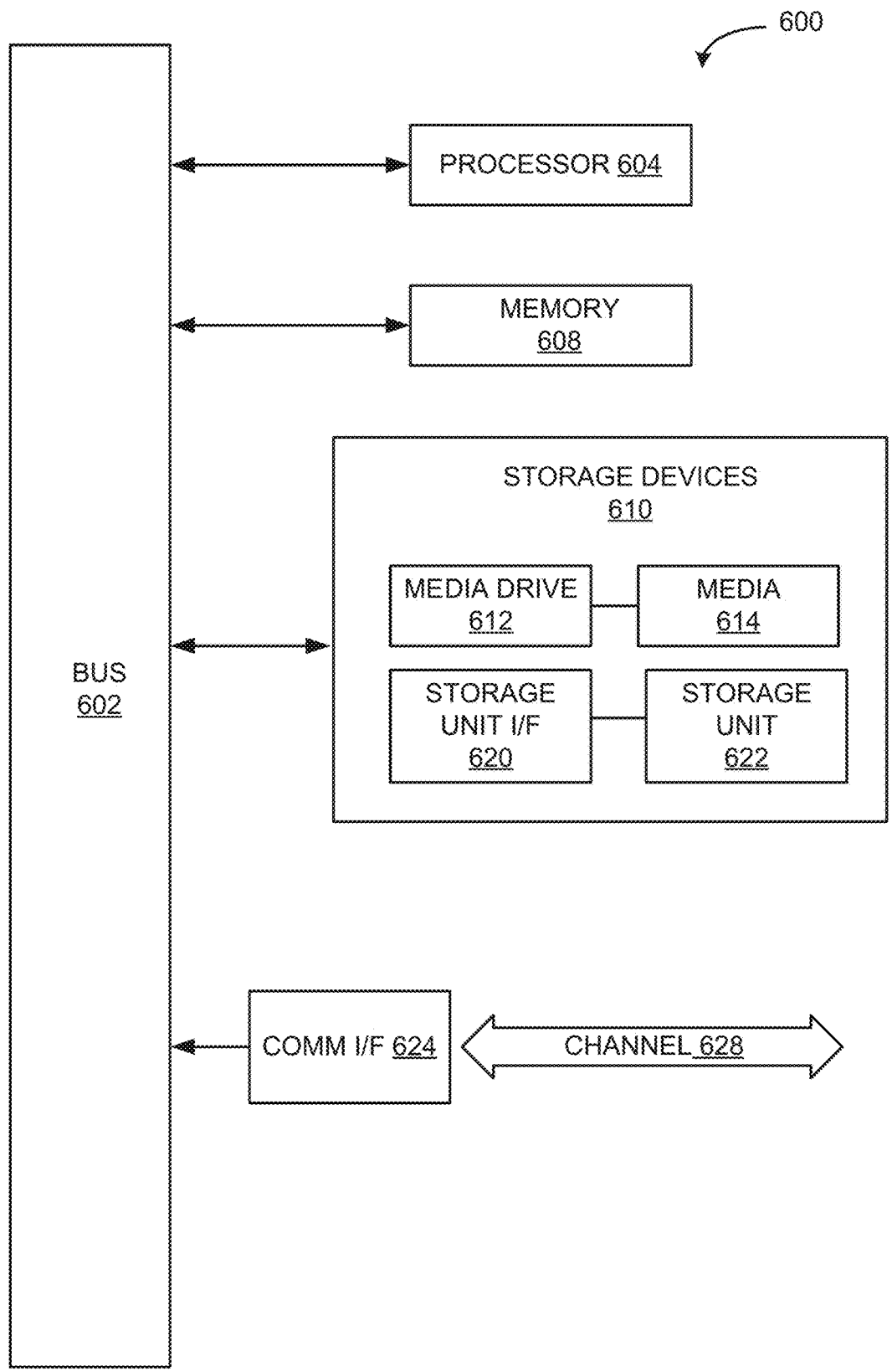
FIG. 6 is an example computing component that may be used to implement various features of embodiments described in the present disclosure.

As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 6. Various embodiments are described in terms of this example-computing component 600. After reading this description, it will become apparent to a person skilled in the relevant art how to implement the application using other computing components or architectures.

Referring now to FIG. 6, computing component 600 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 600 might also represent computing capabilities embedded within or otherwise available to a given device. For example, a computing component might be found in other electronic devices such as, for example, portable computing devices, and other electronic devices that might include some form of processing capability.

Computing component 600 might include, for example, one or more processors, controllers, control components, or other processing devices. This can include a processor, and/or any one or more of the components making up navigation system 614 and its component parts, navigation server/network 624, and controller 650. Processor 604 might be implemented using a general-purpose or special-purpose processing engine such as, for example, a microprocessor, controller, or other control logic. Processor 504 may be connected to a bus 602. However, any communication medium can be used to facilitate interaction with other components of computing component 600 or to communicate externally.

Computing component 600 might also include one or more memory components, simply referred to herein as main memory 608. For example, random access memory (RAM) or other dynamic memory, might be used for storing information and instructions to be executed by processor 604. Main memory 608 might also be used for storing temporary variables or other intermediate information during execution of instructions to be executed by processor 604. Computing component 600 might likewise include a read only memory ("ROM") or other static storage device coupled to bus 602 for storing static information and instructions for processor 504.

The computing component 600 might also include one or more various forms of information storage mechanism 610, which might include, for example, a media drive 612 and a storage unit interface 620. The media drive 612 might include a drive or other mechanism to support fixed or removable storage media 614. For example, a hard disk drive, a solid state drive, a magnetic tape drive, an optical drive, a compact disc (CD) or digital video disc (DVD) drive (R or RW), or other removable or fixed media drive might be provided. Storage media 614 might include, for example, a hard disk, an integrated circuit assembly, magnetic tape, cartridge, optical disk, a CD or DVD. Storage media 614 may be any other fixed or removable medium that is read by, written to or accessed by media drive 612. As these examples illustrate, the storage media 614 can include a computer usable storage medium having stored therein computer software or data.

In alternative embodiments, information storage mechanism 610 might include other similar instrumentalities for allowing computer programs or other instructions or data to be loaded into computing component 600. Such instrumentalities might include, for example, a fixed or removable storage unit 622 and an interface 620. Examples of such storage units 622 and interfaces 620 can include a program cartridge and cartridge interface, a removable memory (for example, a flash memory or other removable memory component) and memory slot. Other examples may include a PCMCIA slot and card, and other fixed or removable storage units 622 and interfaces 620 that allow software and data to be transferred from storage unit 622 to computing component 600.

Computing component 600 might also include a communications interface 624. Communications interface 624 might be used to allow software and data to be transferred between computing component 600 and external devices. Examples of communications interface 624 might include a modem or softmodem, a network interface (such as an Ethernet, network interface card, WiMedia, IEEE 802.XX or other interface). Other examples include a communications port (such as for example, a USB port, IR port, RS232 port Bluetooth® interface, or other port), or other communications interface. Software/data transferred via communications interface 624 may be carried on signals, which can be electronic, electromagnetic (which includes optical) or other signals capable of being exchanged by a given communications interface 624. These signals might be provided to communications interface 624 via a channel 628. Channel 628 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 608, storage unit 620, media 614, and channel 628. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 600 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A system, comprising:
 a light projector on a vehicle; and
 an electronic control unit for controlling an operation of the light projector and configured to:
 detect whether the vehicle is on; and
 in response to detecting that the vehicle is on:
  receive data associated with an environmental condition surrounding the vehicle;

receive data associated with an upcoming trajectory path of the vehicle;
determine the upcoming trajectory path of the vehicle, the determining comprising:
selecting a safest trajectory path from upcoming trajectory paths based on the data associated with the environmental condition;
continuously factoring in, by the electronic control unit, the data associated with the environmental condition; and
modifying the upcoming trajectory path of the vehicle based on the continuously factored data; and
instruct the light projector to project a plurality of light beams onto a surface, each of the plurality of light beams indicating the upcoming trajectory path of the vehicle by a straight arrow, a curved arrow, a U-shaped arrow, or a slanted arrow.

2. The system of claim 1, wherein the data associated with the upcoming trajectory path of the vehicle further comprises GPS data.

3. The system of claim 1, wherein the data associated with the environmental condition comprises traffic information, road sign information, object detection, and road condition information.

4. The system of claim 1, wherein the data associated with the environmental condition is collected by at least one of a camera, a sensor, a navigation system, a vehicle-to-vehicle communication module, a vehicle-to-infrastructure communication module, or a laser scanner.

5. The system of claim 1, further comprising a vehicle communication module configured to transmit and receive GPS data and the data associated with the environmental condition between the vehicle and other vehicles.

6. The system of claim 1, wherein each of the plurality of light beams comprises a projection of at least one of the straight arrow, the curved arrow, the U-shaped arrow, the slanted arrow, words, or numbers.

7. The system of claim 6, wherein each of the plurality of light beams further comprises a projection of a current speed of the vehicle.

8. The system of claim 1, wherein at least one of the plurality of light beams comprises a projection of a fence to indicate an area on the surface on which the vehicle is expected to stop.

9. The system of claim 1, wherein the light projector comprises a light source comprising light emitting diodes or laser diodes.

10. The system of claim 1, wherein the plurality of light beams is projected onto the surface when the vehicle detects a presence of a pedestrian.

11. The system of claim 5, wherein the vehicle communication module alerts nearby vehicles of a presence of a pedestrian.

12. The system of claim 1, wherein the electronic control unit emits an audio notification to pedestrians when the electronic control unit determines that the vehicle during the upcoming trajectory path will collide with an object or a pedestrian.

13. The system of claim 12, wherein the audible notification is provided when the electronic control unit determines a collision with the object or pedestrian occurs within a certain distance from the vehicle.

14. The system of claim 1, wherein the electronic control unit is further configured to:
determine whether the data associated with the environmental condition comprises a pedestrian or a vehicle based on a comparison of a shape, pixel intensity, and line of the data with a shape, pixel intensity, and line of a reference data;
in response to determining that the data associated with the environmental condition comprises a pedestrian or a vehicle, determine whether to change the upcoming trajectory path of the vehicle; and
in response to determining to change the upcoming trajectory path of the vehicle, reroute to a new trajectory path away from the pedestrian or the vehicle.

15. A method comprising:
detecting whether a vehicle is on;
in response to detecting that the vehicle is on:
receiving data associated with an environmental condition surrounding the vehicle;
receiving data associated with an upcoming trajectory path of the vehicle;
determining the upcoming trajectory path of the vehicle based on a safety of upcoming trajectory paths, the determining comprising:
sharing information of locations of curved or hilly sections of a road and a presence of upcoming road signs with another vehicle; and
projecting a plurality of light beams from at least one light projector on the vehicle onto a surface, each of the plurality of light beams indicating the upcoming trajectory path of the vehicle by a straight arrow, a curved arrow, a U-shaped arrow, or a slanted arrow.

16. The method of claim 15, wherein the upcoming trajectory path is a path the vehicle is expected to take.

17. The method of claim 15, wherein the data associated with the upcoming trajectory path of the vehicle comprises at least one of GPS data or the data associated with the environmental condition comprising traffic information, road sign information, objection detection, and road condition information.

18. The method of claim 15, wherein each of the plurality of light beams comprises a projection of at least one of the straight arrow, the curved arrow, the U-shaped arrow, the slanted arrow, words, or numbers.

19. The method of claim 15, wherein at least one of the plurality of light beams comprises a projection of a fence to indicate an area on the surface on which the vehicle is expected to stop.

20. The method of claim 15, further comprising displaying the upcoming trajectory path on a screen in front of a driver of the vehicle.

21. A system, comprising:
a light projector on a vehicle; and
an electronic control unit for controlling an operation of the light projector and configured to:
detect whether the vehicle is on;
in response to detecting that the vehicle is on:
receive data associated with an environmental condition surrounding the vehicle and data associated with an upcoming trajectory path of the vehicle;
determine whether the data associated with the environmental condition comprises a pedestrian or a vehicle based on a comparison of a shape, pixel intensity, and line of the data with a shape, pixel intensity, and line of a reference data;
in response to determining that the data associated with the environmental condition comprises a pedestrian or a vehicle, determine whether to change the upcoming trajectory path of the vehicle;

in response to determining to change the upcoming trajectory path of the vehicle, changing the upcoming trajectory path by rerouting to a new trajectory path away from the pedestrian or the vehicle;
receive data associated with the upcoming trajectory path of the vehicle; and
instruct the light projector to project a plurality of light beams onto a surface, each of the plurality of light beams indicating the upcoming trajectory path of the vehicle by a straight arrow, a curved arrow, a U-shaped arrow, or a slanted arrow.

* * * * *